(12) United States Patent
Rose et al.

(10) Patent No.: US 11,620,388 B2
(45) Date of Patent: Apr. 4, 2023

(54) COMPUTER SYSTEM VULNERABILITY LOCKDOWN MODE

(71) Applicant: BRANCH BANKING AND TRUST COMPANY, Winston-Salem, NC (US)

(72) Inventors: Amy Rose, Chapel Hill, NC (US); Joseph Aguayo, Fuquay Varina, NC (US); Justin Dubs, Raleigh, NC (US)

(73) Assignee: Truist Bank, Charlotte, NC (US)

( * ) Notice: Subject to any disclaimer, the term of this patent is extended or adjusted under 35 U.S.C. 154(b) by 254 days.

(21) Appl. No.: 16/686,482

(22) Filed: Nov. 18, 2019

(65) Prior Publication Data

US 2021/0150034 A1      May 20, 2021

(51) Int. Cl.
*G06F 21/57* (2013.01)
*H04L 9/40* (2022.01)

(52) U.S. Cl.
CPC ........ *G06F 21/577* (2013.01); *H04L 63/1433* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 2002/0184532 A1* | 12/2002 | Hackenberger | ..... | H04L 63/1433 726/4 |
| 2005/0182967 A1* | 8/2005 | Phillips | ............... | H04L 63/1433 726/5 |
| 2005/0187963 A1* | 8/2005 | Markin | ................. | G06F 21/577 707/999.102 |
| 2009/0038015 A1* | 2/2009 | Diamant | ............. | H04L 63/1433 726/25 |
| 2011/0138467 A1* | 6/2011 | Macwan | ............. | H04L 63/1416 726/24 |
| 2013/0198848 A1* | 8/2013 | Wolff | .................... | G06F 21/568 726/25 |
| 2013/0247207 A1* | 9/2013 | Hugard, IV | ........ | H04L 63/1433 726/25 |
| 2016/0094576 A1* | 3/2016 | Oliphant | ............... | G06F 21/554 726/25 |
| 2020/0082096 A1* | 3/2020 | Pistoia | .................. | G06F 21/577 |

* cited by examiner

*Primary Examiner* — Fatoumata Traore
(74) *Attorney, Agent, or Firm* — Kilpatrick Townsend & Stockton LLP; Michael A. Springs, Esq.

(57) ABSTRACT

Targeted lockdown of a computer system for an identified vulnerability is provided. The targeted lockdown includes configuring a vulnerability lockdown module implemented on a computer system to perform targeted actions to change a configuration of the computer system. The computer system may be scanned by a vulnerability scanner configured to identify vulnerabilities. In response to identifying a vulnerability, the vulnerability may be communicated to the vulnerability lockdown module and the vulnerability lockdown module may implement a vulnerability lockdown mode by causing the computer system to perform the targeted actions to change the configuration of the computer system by restricting functionality of portions of the computer system affected by the identified vulnerability.

15 Claims, 5 Drawing Sheets

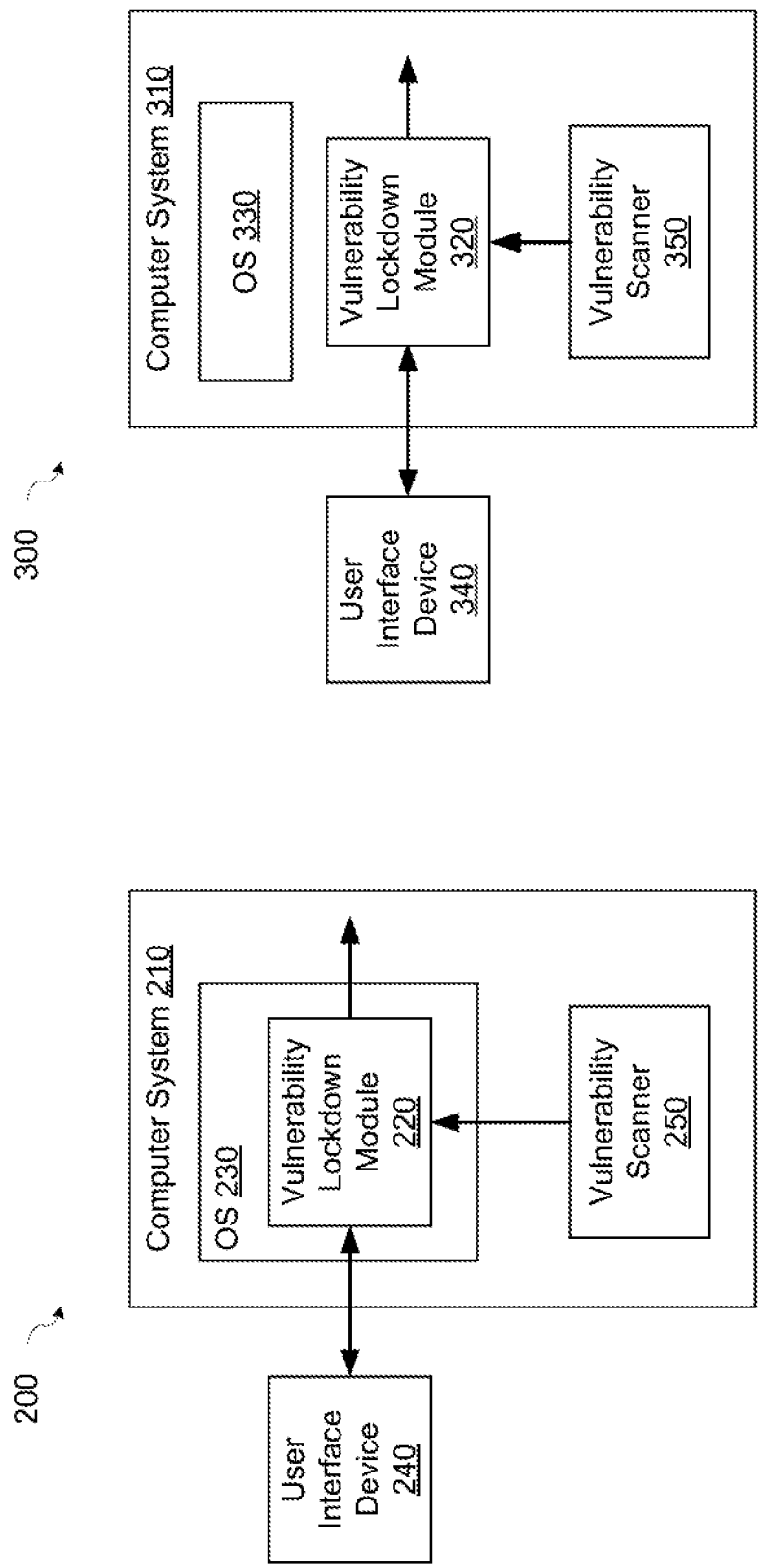

COMPUTER SYSTEM VULNERABILITY LOCKDOWN MODE

TECHNICAL FIELD

The present disclosure relates to computer system security, and more particularly, though not necessarily exclusively, to targeted lockdown of computer resources potentially affected by an identified vulnerability.

BACKGROUND

A computer system vulnerability refers to a defect in a computer system that can leave the computer system open to attack. The vulnerability may be a weakness in any portion (e.g., hardware or software) of the computer system that allows information to be exposed to a threat. The vulnerability may be exploited by a threat actor, such as a hacker, to perform unauthorized actions within the computer system. Vulnerabilities may include distributed denial-of-service attacks, which overload networks with frequent or high volumes of traffic or requests until it is no longer functional; malware, which can be used to steal or destroy data when introduced to the system through email or software downloads; password attacks and attempts to steal passwords to gain system access; phishing, which tricks users through a trusted third-party into sharing sensitive data; and ransomware, a type of malware that locks users out of their system.

Vulnerability scanning may be performed to detect and identify potential points of exploit on a computer or network. A software vulnerability scanner can compare details about a target attack surface to a database of information about known security holes in services and ports, anomalies in packet construction, and potential paths to exploitable programs or scripts. In some cases, hardware or software vendors may identify vulnerabilities and provide software upgrades, or patches, to address the vulnerabilities. But, implementation delays and other factors involved in upgrading or patching software vulnerabilities can leave computer systems vulnerable.

SUMMARY

In one example, a computer-implemented method may include configuring a vulnerability lockdown module implemented on a computer system to perform targeted actions to change a configuration of the computer system. The computer system may be scanned by a vulnerability scanner configured to identify vulnerabilities on the computer system. In response to identifying a vulnerability by the vulnerability scanner, the vulnerability may be communicated to the vulnerability lockdown module, and the vulnerability lockdown module may implement a vulnerability lockdown mode by causing the computer system to perform the targeted actions to change the configuration of the computer system by restricting functionality of portions of the computer system affected by the identified vulnerability.

In another example, a non-transitory computer readable medium may include instructions for causing one or more processors to perform operations including configuring a vulnerability lockdown module to perform one or more targeted actions to change a configuration of a computer system, and identifying vulnerabilities on the computer system. In response to identifying a vulnerability, the operations may include communicating the vulnerability to the vulnerability lockdown module, and implementing a vulnerability lockdown mode by the vulnerability lockdown module by causing the computer system to perform the targeted actions to change the configuration of the computer system by restricting functionality of portions of the computer system affected by the identified vulnerability.

In a further example, a computer system may include a memory configured to store processor readable instructions and a processor coupled to the memory and operable to execute the processor readable instructions. The instructions may cause the processor to perform operations including configuring a vulnerability lockdown module to perform one or more targeted actions to change a configuration of a computer system, and identifying vulnerabilities on the computer system. In response to identifying a vulnerability, the operations may include communicating the vulnerability to the vulnerability lockdown module, and implementing a vulnerability lockdown mode by the vulnerability lockdown module by causing the computer system to perform the targeted actions to change the configuration of the computer system by restricting functionality of portions of the computer system affected by the identified vulnerability.

BRIEF DESCRIPTION OF THE DRAWINGS

FIG. 2 is a block diagram illustrating an example of an implementation of a vulnerability lockdown module as part of an operating system (OS) according to some aspects of the present disclosure.

FIG. 3 is a block diagram illustrating an example of an implementation of a vulnerability lockdown module as an application running on an OS according to some aspects of the present disclosure.

DETAILED DESCRIPTION

Figure 1:
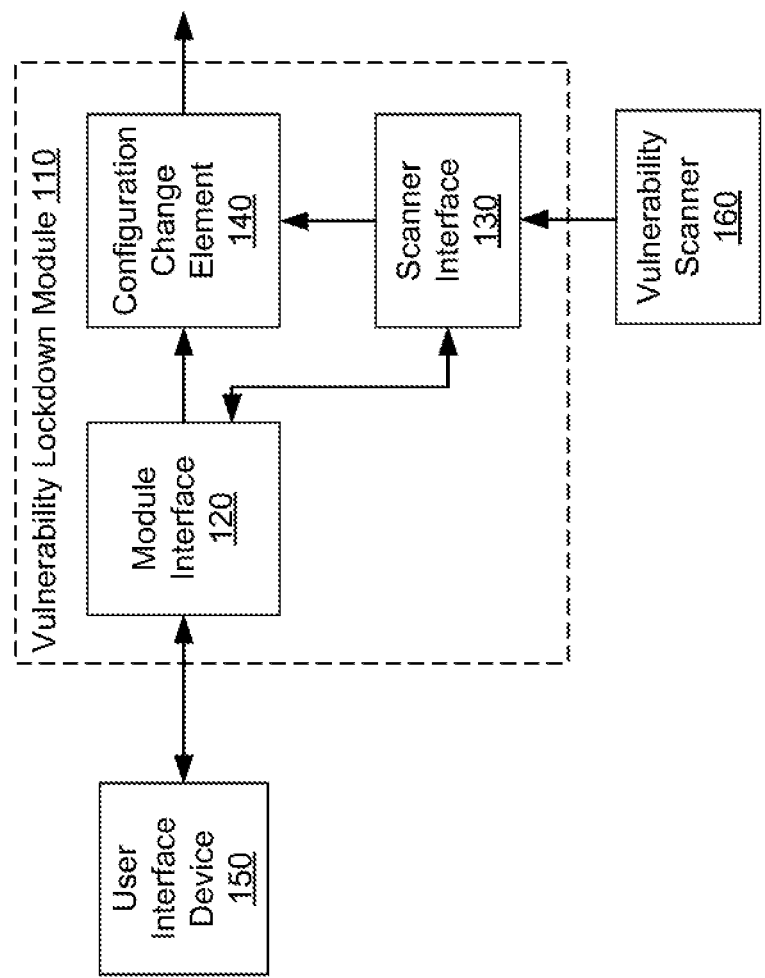
FIG. 1 is a block diagram illustrating an example of a vulnerability lockdown module according to some aspects of the present disclosure.

A computer system vulnerability may be exploited by a hacker to perform unauthorized actions within the computer system. Software patches may be developed to address vulnerabilities after they are identified, but concerns about system stability may delay installing the patches once the patches are released. A computer system may be vulnerable between the time a vulnerability is identified and a patch is released, as well as during the delay between release and installation of the patch. Some aspects of the present disclosure enable portions of a computer affected by an identified vulnerability to be selectively locked down to mitigate the effects of the vulnerability while allowing unaffected portions of the computer system to retain their functionality.

As vulnerabilities are identified in operating systems, drivers, applications, etc., vendors release software updates, or patches, to be installed on a computer system to mitigate the identified vulnerabilities. The patches are code changes to the affected software and the patches can involve substantial in-house testing prior to being deployed. As a result of this delay, computer systems may be at risk of the vulnerability being exploited before a patch is applied to the system. In some cases, vendors may identify and disclose vulnerabilities prior to patches being developed. Computer systems may also be at risk of the vulnerability being exploited after the vulnerability is identified but before a patch is released.

Network Access Control (NAC) tools can validate the configuration of a computer system and potentially its vulnerabilities before deciding to allow the computer system onto the network. NACs just quarantine devices from joining the network. For example, a personal laptop of a user may be used outside of the network and be infected with malware. NAC tools may reject the laptop and not allow it on to the network given that it has some vulnerability. In this case, it is the network (i.e., something external to the device) determining that the device is not secure enough to join the network.

Vulnerability monitoring tools can detect thousands of vulnerabilities for computer systems or other network devices on enterprise system networks. System administrators can manually run a software patch or can enable automatic patching updates when vulnerabilities are discovered. But, either manual or automatic patching may lead to system outages if enterprise-wide testing of the patches on the particular computer system is not performed prior to deployment. These competing priorities of system vulnerabilities versus potential system outages may cause system administrators for these enterprise systems to delay patching or upgrading vulnerable systems.

Certain aspects of the present disclosure can provide a vulnerability lockdown mode for a computer system or computer device to protect the system or network device in the interim between identifying vulnerabilities and applying patches, including the time window between when the vulnerability is discovered and the vendor releases the patch. The vulnerability lockdown mode may be configured based on the type of vulnerability discovered as well as the sensitivity of the data or applications on a specific computer system or network device. Upon identification of a vulnerability, for example, by a vulnerability scanner, the computer system or network device itself can change its configuration to prevent using a vulnerable service or increasing the logging related to that vulnerable service.

In accordance with some aspects of the present disclosure, when a vulnerability is discovered on a system or network device, the configuration of the system or network device may be dynamically changed to make the system or network device more secure. Changing the configuration of a system or network device can involve altering the way in which a user interacts with the system or network device, or altering the way in which the system functions in light of the vulnerability, or both. Examples of configuration changes that alter the way in which a user interacts with the system or network device can include requiring multifactor authentication, such as requiring a username, password, and RSA token to access or transfer files to or from that system, preventing a user from remotely logging in to the system or device, etc. Changing the configuration of a system or network device by altering the way in which the system functions can involve increased monitoring and logging of system activities such as operating system, application, and user activities. In some cases, changing the configuration of a system or network device can involve turning off affected service or protocols for example, Remote Desktop Protocol (RDP) or direct Secure SHell (SSH)), etc. In other cases, changing the configuration of a system or network device can involve restricting network communications, for example, by closing certain TCP ports. Various changes to the configuration of a system or network device to address identified vulnerabilities. Other changes to the configuration of a system or device may be implemented without departing from the scope of the present disclosure.

A vulnerability lockdown mode can also be configurable based on the type of data stored on a vulnerable system, for example, Health Insurance Portability and Accountability Act (HIPAA) data, financial data, etc. The changes to the configuration of the system or device may depend on the type of vulnerability (e.g., buffer-overflow attack, code injection, etc.) as well as the potential severity of the impact on the system or device if the vulnerability is exploited.

A vulnerability scanner may be utilized in the identification and detection of vulnerabilities. A vulnerability scanner is a program utilized to assess computers, networks or applications for known weaknesses arising from misconfigurations or flawed programming within a network-based asset such as a firewall, router, web server, application server, etc., that may enable a malicious actor to hack into a computer system or network. The scanner can identify vulnerabilities and patches that are released by software and equipment vendors to enable system administrators to identify changes that should ultimately be made to their systems. Vulnerability scanners may run periodically or continuously in the background and may generate notifications, for example, on a dashboard related to the scanner, regarding detected vulnerabilities and available patches for the vulnerabilities.

A scanner may scan computers or devices at the IP addresses in the computing environment looking for known vulnerabilities on the computer or device that may be identified by signatures for the vulnerabilities. When a signature for a vulnerability in a certain version of software installed on a computer or device matches a known vulnerability signature, a notification may be generated on the dashboard of the vulnerability scanner. A system administrator may then decide on any action that should be taken regarding the identified vulnerability.

Certain aspects of the present disclosure provide systems and methods for automatically implementing pre-configured actions (e.g., lockdown modes) to mitigate effects of identified vulnerabilities prior to the deployment of software patches. For example, if a vulnerability is identified that enables hacking into the computer system on the Remote Desktop protocol (RDP), the system can be configured to implement a lockdown mode specific to (e.g., targeted to) the RDP vulnerability by locking down RDP or increasing the logging on that particular system. The extent of the lockdown may be targeted to limiting the operation of the software affected by the identified vulnerability, rather than locking down overall operation of the affected computer or device. The configuration of the system may be altered automatically based on the fact that a certain vulnerability was identified in that particular system.

FIG. 1 is a block diagram illustrating an example of a vulnerability lockdown module 110 according to some aspects of the present disclosure. The vulnerability lockdown module 110 may include a module interface 120, a scanner interface 130 and a configuration change element 140. The module interface 120 may receive configuration information for implementing a targeted vulnerability lockdown mode from a user via a user interface device 150. The user interface device 150 may be a user interface of a computer system or network device on which the vulnerability lockdown module 110 is implemented. In some implementations, the user interface device 150 may be a user interface of a separate computer system, for example, a system administrator computer system, in communication with one or more other computer systems or network devices configured to implement the vulnerability lockdown module 110.

The configuration information received by the module interface 120 may indicate the targeted lockdown actions to be performed by the vulnerability lockdown module 110 including, but not limited to, one or more of increasing the amount of logging done on a system, requiring multifactor authentication (e.g., username, password, and RSA token), or other alterations to the configuration of the computer system or network device such as disabling communication protocols, closing TCP ports, stopping direct SSH access into the system, or other actions that change the configuration of the computer system or network device to mitigate the effects of an identified vulnerability.

The module interface 120 may receive configuration information from the user interface device 150 and forward portions of the configuration information to the scanner interface 130 and the configuration change element 140. The scanner interface 130 may be in communication with the module interface 120, the configuration change element 140, and a vulnerability scanner 160. The scanner interface 130 may receive information from the module interface 120 related to the types of vulnerabilities or specific vulnerabilities that may be identified and communicated to the vulnerability lockdown module 110 by the vulnerability scanner 160 for which targeted lockdown actions may be configured. The configuration change element 140 may receive information from the module interface 120 related to the targeted lockdown actions to be taken by the computer system or network device when a vulnerability is identified.

When a vulnerability is identified by the vulnerability scanner 160, the vulnerability scanner 160 may communicate the vulnerability to the scanner interface 130 of the vulnerability lockdown module 110. If the scanner interface 130 has been configured to recognize the type of vulnerability or specific vulnerability communicated by the vulnerability scanner 160, the vulnerability scanner 160 may communicate information regarding the vulnerability to the configuration change element 140 via the scanner interface 130. Upon receiving the information about the vulnerability from the scanner interface 130, the configuration change element 140 may cause the computer system or network device to implement the targeted lockdown actions configured by the user.

In some cases, the scanner interface 130 may not have been configured to recognize the type of vulnerability or specific vulnerability communicated by the vulnerability scanner 160. In such cases, the scanner interface 130 may communicate the identified vulnerability type or specific vulnerability to the module interface 120. The module interface 120 may generate a notification or warning regarding the identified vulnerability type or specific vulnerability and may communicate the notification or warning to the user interface device 150. The user may receive the notification or warning and determine how or if the vulnerability lockdown module 110 should be configured (e.g., to lockdown the system or not) in response to the identified vulnerability.

The vulnerability lockdown module may be configurable by a user, for example, a system administrator, to perform specific actions to alter the configuration of a system or device based on a type of detected vulnerability. When a vulnerability scanner identifies a vulnerability on a computer system or other network device, the scanner may communicate the vulnerability to the vulnerability lockdown module, and the vulnerability lockdown module may perform the preconfigured actions to implement a targeted lockdown based on the type of vulnerability identified by the scanner. For example, on a system where system configuration alterations are acceptable (e.g., on a desktop computer) and an RDP vulnerability is identified, the targeted lockdown action configured by the user may be to cause the vulnerability lockdown module to automatically disable RDP on the system (e.g., the desktop computer). A potential attacker would automatically be prevented from exploiting the RDP vulnerability. In some cases, a portion of the computer system indirectly affected by an identified vulnerability may be locked down. For example, if an RDP vulnerability is identified that allows attackers to log in remotely without authenticating, the logging configuration or firewall configuration may be altered in addition or alternatively to disabling RDP.

In some cases, when a vulnerability is identified by the scanner and communicated to the vulnerability lockdown module, the vulnerability lockdown module may provide a notification, for example, on a computer terminal of a user (e.g., a system administrator), and in response to the notification the user may configure the targeted lockdown actions to be implemented by the vulnerability lockdown module. Alternatively, if the vulnerability is related to a specific protocol, rather than automatically disabling the protocol, the vulnerability lockdown module may be configured to include a warning as part of the notification that a high risk event is occurring due to the presence of the vulnerability.

The configurable targeted lockdown actions implemented by the vulnerability lockdown module may also be implemented taking into account other criteria, for example, but not limited to, the characteristics of the computer system or device on which the lockdown actions will be implemented, the type of data associated with or stored on the computer system or device, etc. For example, when a vulnerability is identified on a system having a configuration that for some reason should not be changed, the configured lockdown action may be to increase the amount of logging done on that system because of the identified vulnerability, rather than locking down a particular service or application.

When a vulnerability is identified on a system storing sensitive data, for example, Health Insurance Portability and Accountability Act (HIPAA) data, a more stringent lockdown mode involving several different actions to be implemented by the vulnerability lockdown module may be configured. For example, the vulnerability lockdown module may be configured to require multifactor authentication (e.g., username, password, and RSA token) to access or transfer files to or from the system, disabling certain communication protocols on the system, close a number of previously open TCP ports, stop direct SSH access into the system, etc. The vulnerability lockdown module may be configured to perform different or additional lockdown actions without departing from the scope of the present disclosure. Because the lockdown actions implemented by the vulnerability lockdown module are targeted to specific vulnerabilities, only those applications and services affected by the vulnerability may be locked down while other functions and capabilities of the computer system or device may remain available.

In some implementations, the vulnerability lockdown module may be part of the operating system (OS) of a computer system or device. FIG. 2 is a block diagram illustrating an example of an implementation 200 of a vulnerability lockdown module 220 as part of an OS according to some aspects of the present disclosure. The vulnerability lockdown module 220 may be included as part of the OS 230 of the computer system 210. The OS 230 may manage the computer system 210 resources (e.g., processor, memory, etc.), establish a user interface (e.g., to communicate with the user interface device 240), and execute and provide services for applications software.

The vulnerability lockdown module 220 may be configurable by a user, for example, a system administrator, via the user interface device 240 communicating with the OS 230 of the computer system 210. The user may configure the vulnerability lockdown module 220 via the user interface device 240 to perform targeted actions to alter the configuration of the computer system 210 based on a specific type of detected vulnerability.

The vulnerability scanner 250 may execute periodically or continuously in the background and may identify vulnerabilities on the computer system 210. Vulnerabilities identified by the vulnerability scanner 250 may be communicated to the vulnerability lockdown module 220 of the OS 230. In cases where the vulnerability lockdown module 220 has been configured by a user to respond to the specific identified vulnerability or type of vulnerability, the vulnerability lockdown module 220 may implement one or more targeted lockdown actions to cause a change to the configuration of the computer system, (e.g., via the configuration change element 140 illustrated in FIG. 1), such as increasing the amount of logging done on the system, requiring multifactor authentication, disabling communication protocols, etc.

In cases where the vulnerability lockdown module 220 has not been configured by a user to respond to the specific identified vulnerability or type of vulnerability, the vulnerability lockdown module 220 may generate a notification or warning and may communicate the notification or warning via the user interface device 240. The user may then determine whether to configure the targeted lockdown actions to be implemented by the vulnerability lockdown module 220.

In some implementations, the vulnerability lockdown module may be an application running on top of the OS. FIG. 3 is a block diagram illustrating an example of an implementation 300 of a vulnerability lockdown module 320 as an application running on an OS 330 according to some aspects of the present disclosure. A user (e.g., a system administrator) may configure the vulnerability lockdown module 320 application via the user interface device 340 to perform targeted actions to alter the configuration of the computer system 310 based on a specific type of detected vulnerability. In some implementations, the computer system 310 may be a client of a vulnerability scanner service provided by a server. In some implementations, the vulnerability lockdown module may be configured according to a script running on a separate machine connected to the network.

The vulnerability scanner 350 may execute periodically or continuously in the background and may identify vulnerabilities on the computer system 310. Vulnerabilities identified by the vulnerability scanner 350 may be communicated to the vulnerability lockdown module 320. In cases where the vulnerability lockdown module 320 has been configured by a user to respond to the specific identified vulnerability or type of vulnerability, the vulnerability lockdown module 320 may implement one or more targeted lockdown actions to cause a change to the configuration of the computer system, (e.g., via the configuration change element 140 illustrated in FIG. 1), such as increasing the amount of logging done on the system, requiring multifactor authentication, disabling communication protocols, etc.

In cases where the vulnerability lockdown module 320 has not been configured by a user to respond to the specific identified vulnerability or type of vulnerability, the vulnerability lockdown module 320 may generate a notification or warning and may communicate the notification or warning via the user interface device 340. The user may then determine whether to configure the targeted lockdown actions to be implemented by the vulnerability lockdown module 320.

According to some aspects of the present disclosure, a vulnerability lockdown mode may be automatically deactivated when the vulnerability lockdown module is informed that the vulnerability no longer exists. For example, a vulnerability scanner may identify a vulnerability for which the vulnerability lockdown module implements targeted lockdown actions. On a subsequent scan (e.g., minutes, hours, days, weeks later), the vulnerability scanner may no longer detect the vulnerability. The vulnerability scanner may no longer detect the vulnerability because, for example, a patch has been applied to obviate the vulnerability. The vulnerability lockdown module may detect that the vulnerability scanner no longer reports the previously identified vulnerability, and may deactivate the previously implemented lockdown actions targeted to the specific vulnerability. Alternatively, a user may manually deactivate previously implemented lockdown actions via the user interface device.

The vulnerability lockdown module may be implemented and configured on any network device, for example, but not limited to, a computer system, a desktop computer, a server, a laptop computer, etc., without departing from the scope of the present disclosure.

Figure 4:
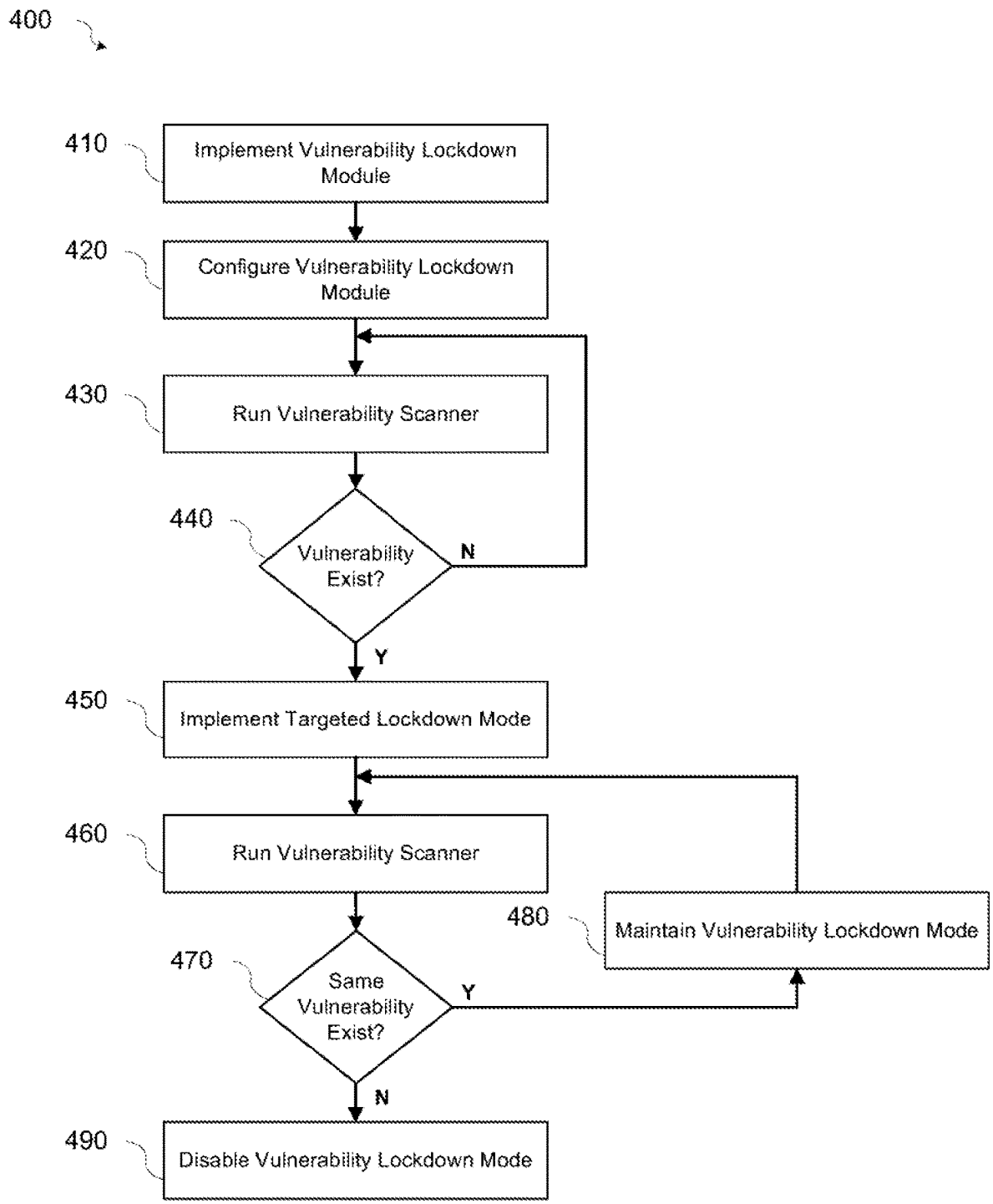
FIG. 4 is a flowchart illustrating an example of a method for detecting and mitigating a vulnerability on a computer system according to some aspects of the present disclosure.

FIG. 4 is a flowchart illustrating an example of a method 400 for detecting and mitigating a vulnerability on a computer system according to some aspects of the present disclosure. At block 410, a vulnerability lockdown module may be implemented on the computer system. The vulnerability lockdown module may be part of the operating system (OS) of the computer system or may be an application running on top of the OS.

At block 420, the vulnerability lockdown module may be configured. The vulnerability lockdown module may be configurable by a user, for example, a system administrator, to implement actions targeted to a specific vulnerability or type of vulnerability and may change the configuration of the system. The changes to the configuration of the system may depend on the type of vulnerability or the potential severity of the impact on the system or device if the vulnerability is exploited, or both. The configuration may be performed via a user interface on the computer system, a user interface on a different computer system, for example, a system administrator terminal, or by a script running on another computer system. The configuration may be based on the type of data stored on a vulnerable system.

At block 430, a vulnerability scanner may be run to detect vulnerabilities. The vulnerability scanner may execute periodically or continuously in the background and may identify vulnerabilities that may exist on the computer system. The vulnerability scanner may scan the computer system looking for known vulnerabilities that may be identified by signatures for the vulnerabilities.

At block 440, it may be determined whether vulnerabilities exist on the computer system based on the results of the vulnerability scan. In response to determining that no vulnerabilities exist on the computer system (440-N), the method may continue with the next vulnerability scan at block 430.

In response to determining that vulnerabilities do exist on the computer system (440-Y), at block 450, vulnerability lockdown module may implement a lockdown mode by performing the targeted lockdown actions configured by the user. The extent of the lockdown may be targeted to limiting the operation of the software affected by the identified vulnerability, rather than locking down overall operation of the affected computer system or device.

At block 460, the vulnerability scanner may be run again. The vulnerability scanner may be run at a subsequent time (e.g., minutes, hours, days, weeks later) on a periodic or continuous basis.

At block 470, it may be determined whether the same vulnerability still exists based on the results of the subsequent vulnerability scan. In response to determining that the same vulnerability still exists (e.g., the vulnerability scanner identifies the same vulnerability) (470-Y), at block 480, the vulnerability lockdown module may maintain the previously implemented targeted lockdown mode, and the method may continue at block 460.

In response to determining that the same vulnerability does not still exist (e.g., the vulnerability scanner does not identify the same vulnerability) (470-N), at block 490 the vulnerability lockdown module may disable the previously implemented targeted lockdown mode and the computer system may be restored to full operational capability.

The specific steps illustrated in FIG. 4 provides a particular method for detecting and mitigating a vulnerability on a computer system according to embodiments of the present disclosure. Other sequences of steps may also be performed according to alternative embodiments. For example, alternative embodiments may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. Many variations, modifications, and alternatives are possible.

Figure 5:
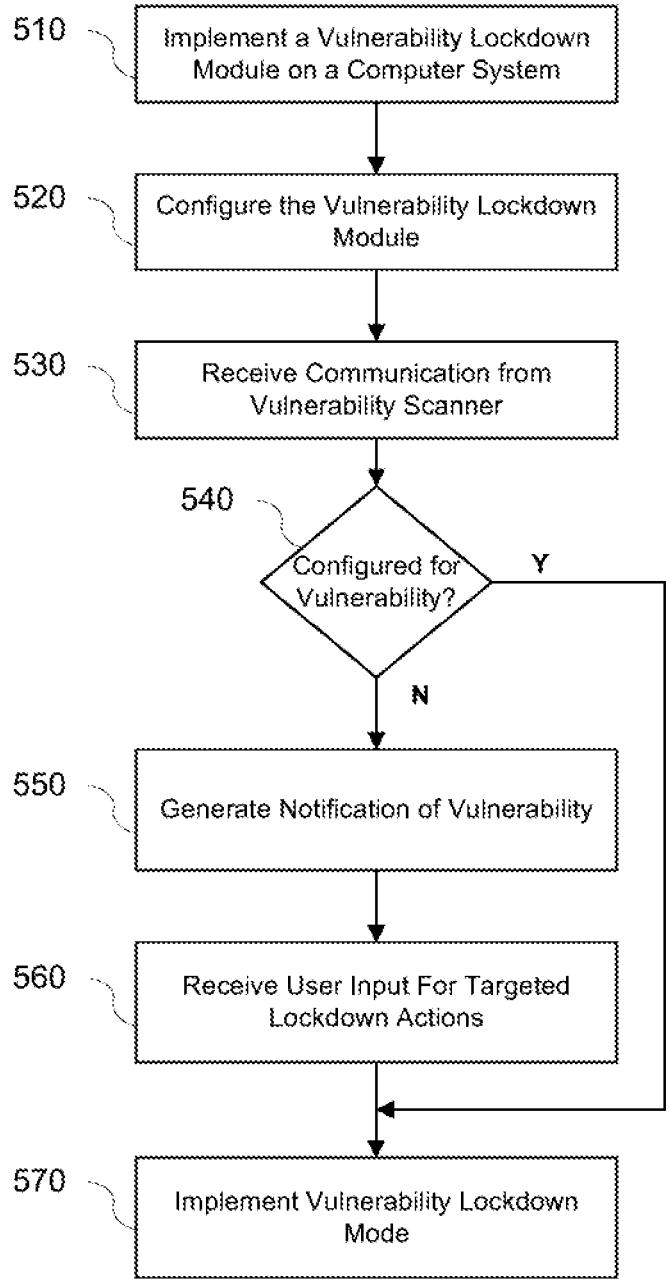
FIG. 5 is a flowchart illustrating an example of a method for implementing a vulnerability lockdown mode according to some aspects of the present disclosure.

FIG. 5 is a flowchart illustrating an example of a method 500 for implementing a vulnerability lockdown mode according to some aspects of the present disclosure. Referring to FIG. 5, at block 510, a vulnerability lockdown module, for example, the vulnerability lockdown module 110 illustrated in FIG. 1, may be implemented. The vulnerability lockdown module may be implemented on a computer system or network device, for example, the computer systems or network devices illustrated in FIG. 6. In some cases, the vulnerability lockdown module may be part of the operating system (OS) of a computer system or device. In some implementations, the vulnerability lockdown module may be an application running on top of the OS.

At block 520, the vulnerability lockdown module may be configured to implement vulnerability lockdown modes. For example, the vulnerability lockdown module may be configured by a user (e.g., a system administrator) via a user interface device of a computer system or device on which the vulnerability lockdown module is implemented. In some cases, the vulnerability lockdown module may be configured by the user from a different computer system, for example, a computer system of a system administrator, or by a script running on a different computer system. The vulnerability lockdown module may communicate with the user interface device via a module interface (e.g., the module interface 120).

The vulnerability lockdown module may be configured by the user with information indicating targeted lockdown actions to be performed. Targeted lockdown actions may be configured for specific vulnerabilities or types of vulnerabilities that may be identified to the vulnerability lockdown module. The information provided by the user may configure the vulnerability lockdown module to implement the targeted vulnerability lockdown mode. The targeted lockdown actions may include, for example, but not limited to, one or more of increasing the amount of logging done on a system, requiring multifactor authentication (e.g., username, password, and RSA token), or other alterations of the configuration of the computer system or network device such as disabling communication protocols, closing TCP ports, stopping direct SSH access into the system, or other actions that change the configuration of the computer system or network device to mitigate the effects of an identified vulnerability.

At block 530, the vulnerability lockdown module may receive a communication from a vulnerability scanner (e.g., the vulnerability scanner 160). The vulnerability lockdown module may receive the communication from the vulnerability scanner via a scanner interface (e.g., the scanner interface 130). The vulnerability scanner may execute periodically or continuously in the background. The vulnerability scanner may identify one or more vulnerabilities present on the particular computer system or device.

At block 540, it may be determined whether the vulnerability lockdown module is configured to implement a vulnerability lockdown mode for the one or more identified vulnerabilities. For example, it may be determined by the scanner interface 130 whether the vulnerability identified by the vulnerability scanner corresponds to a vulnerability for which targeted lockdown actions have been configured by the user.

In response to determining that a vulnerability lockdown mode is not configured to implement a vulnerability lockdown mode for the one or more identified vulnerabilities (540-N), at block 550, the scanner interface 130 may communicate the identified vulnerability type or specific vulnerability to the module interface 120. The module interface 120 may generate a notification or warning regarding the identified vulnerability type or specific vulnerability and may communicate the notification or warning to the user interface device 150.

At block 560, the user may receive the notification or warning and determine how or if the vulnerability lockdown module 110 should be configured (e.g., to lockdown the system or not) in response to the identified vulnerability. Based on the identified vulnerability, the user may provide information to configure the vulnerability lockdown module 110 to perform specific actions for altering the configuration of a system or device based on the identified vulnerability to mitigate the vulnerability.

At block 570, the vulnerability lockdown module may implement the configured targeted vulnerability lockdown actions. For example, based on the specific vulnerability or type of vulnerability identified by the vulnerability scanner, the change configuration element of the vulnerability lockdown module may implement one or more actions, including, but not limited to, increasing the amount of logging done on a system, requiring multifactor authentication (e.g., username, password, and RSA token), or other alterations to the configuration of the computer system or network device such as disabling communication protocols, closing TCP ports, stopping direct SSH access into the system, or other actions that change the configuration of the computer system or network device to mitigate the effects of an identified vulnerability. Other targeted lockdown actions may be performed without departing from the scope of the present disclosure.

In response to determining that the vulnerability lockdown mode is configured to implement a vulnerability lockdown mode for the one or more identified vulnerabilities (540-Y), at block 570, the vulnerability lockdown module may implement the configured targeted vulnerability lockdown actions for the specific vulnerability or type of vulnerability identified by the vulnerability scanner as explained above.

The specific steps illustrated in FIG. 5 provides a particular method for implementing a vulnerability lockdown mode according to embodiments of the present disclosure. Other sequences of steps may also be performed according to alternative embodiments. For example, alternative embodiments may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. Many variations, modifications, and alternatives are possible.

Figure 6:
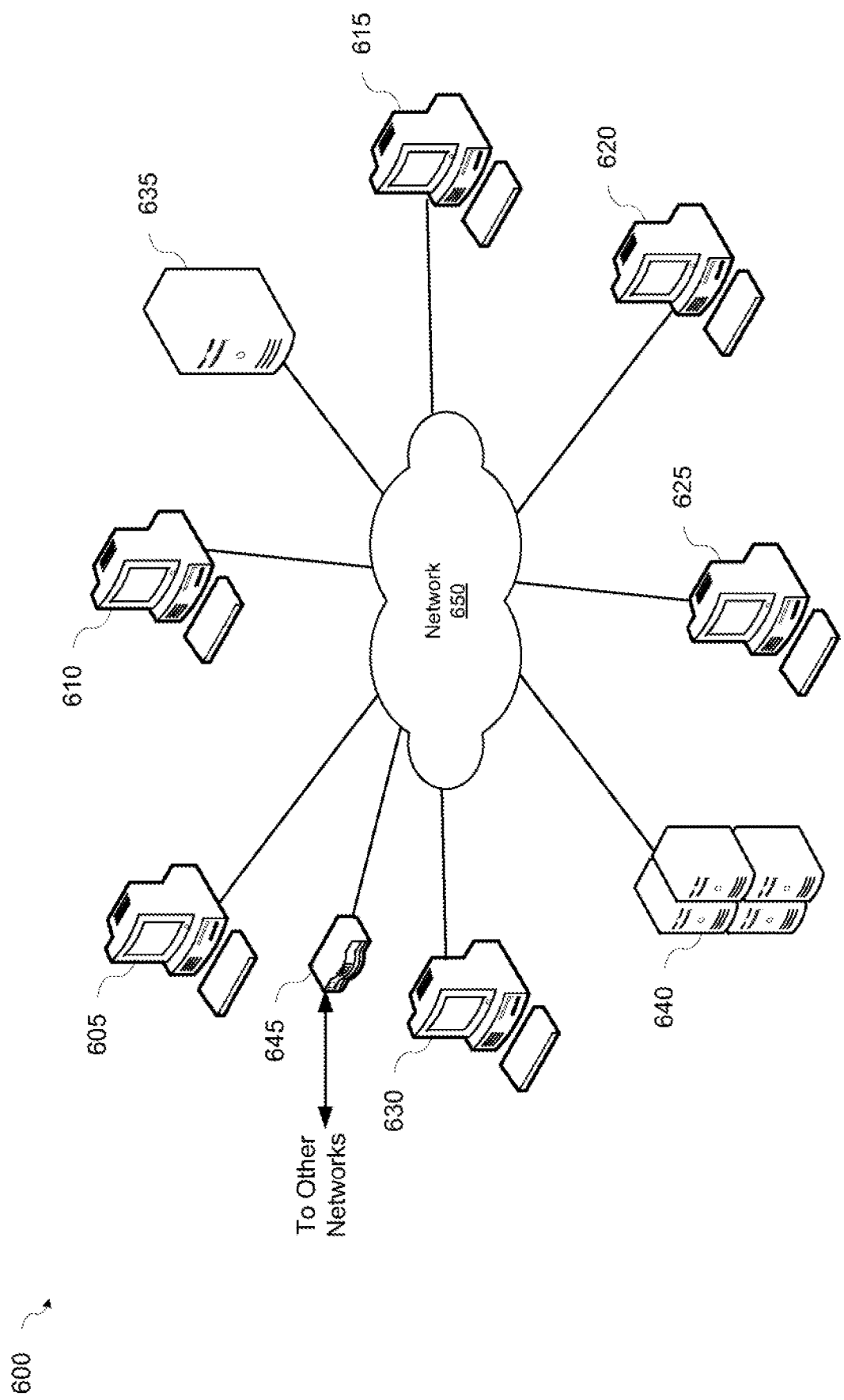
FIG. 6 is a diagram illustrating an example of a network environment for implementing some aspects of the present disclosure.

FIG. 6 is a diagram illustrating aspects of an example network environment 600 for implementing some aspects in accordance with the present disclosure. Different environments may be used, as appropriate, to implement various embodiments. Referring to FIG. 6, the example network environment 600 may include computer systems 605-630, servers 635-640, one or more routers 645, as well as other devices (not shown) connected via network 650.

The computer systems 605-630 and servers 635-640 in the network environment 600 may include one or more processors, and these processors may include one or more processing cores. The computer systems 605-630 and servers 635-640 may also include memory and peripheral devices. In some implementations, the network environment 600 may include a router 645. The router 645 may provide a connection to other networks, for example, sub-networks (subnets), or Local Area Networks (LANs).

As described above with respect to FIGS. 1 and 2, the vulnerability lockdown module may be implemented on any of the computer systems 605-630 and servers 635-640 in the network environment 600.

The methods 400 and 500 may be embodied on a non-transitory computer readable medium, for example, but not limited to, a memory of a computer system (e.g., computer systems 605-630) or server (e.g., servers 635-640) or other non-transitory computer readable medium known to those of skill in the art, having stored therein a program including computer executable instructions for making a processor, computer, or other programmable device execute the operations of the methods.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A computer-implemented method, comprising:
configuring a vulnerability lockdown module implemented on a computer system to perform targeted actions to change a configuration of the computer system, wherein the computer system is a computer or network device connected to a network, and wherein the vulnerability lockdown module is part of an operating system (OS) of the computer system or an application executing on the OS of the computer system;
identifying a vulnerability on the computer system by scanning with a vulnerability scanner;
configuring one or more targeted actions to be performed by the computer system in response to identification of a specific vulnerability or type of vulnerability, wherein the targeted actions are configured based at least in part on a type of data stored on the computer system and a potential severity of an impact on the computer system if the vulnerability is exploited;
communicating the vulnerability to the vulnerability lockdown module; and
implementing, by the vulnerability lockdown module, a vulnerability lockdown mode by causing the computer system to perform the targeted actions to change the configuration of the computer system by restricting functionality of portions of the computer system affected by the identified vulnerability,
wherein the targeted actions performed by the computer system comprise increased logging of activities of the computer system.

2. The computer-implemented method of claim 1, wherein the vulnerability lockdown mode is operable to change the configuration of the computer system by limiting functionality of the computer system with respect to operations of the computer system that are affected by the identified vulnerability while permitting operations of the computer system unaffected by the identified vulnerability.

3. The computer-implemented method of claim 1, further comprising:
providing a notification requesting configuration information via a user interface device when the targeted actions have not been configured for an identified vulnerability.

4. The computer-implemented method of claim 1, wherein the vulnerability lockdown module comprises a part of an operating system of the computer system.

5. The computer-implemented method of claim 1, wherein the vulnerability lockdown module comprises an application executing on the computer system.

6. The computer-implemented method of claim 1, further comprising:
disabling the vulnerability lockdown mode when the identified vulnerability is no longer detected by a subsequent vulnerability scan.

7. A non-transitory computer readable medium having stored therein instructions that are executable by one or more processors to perform operations for providing a vulnerability lockdown mode, the operations including:
configuring a vulnerability lockdown module to perform one or more targeted actions to change a configuration of a computer system, wherein the computer system is a computer or network device connected to a network, and wherein the vulnerability lockdown module is part of an operating system (OS) of the computer system or an application executing on the OS of the computer system;

identifying vulnerabilities on the computer system;

configuring one or more targeted actions to be performed by the computer system in response to identification of a specific vulnerability or type of vulnerability, wherein the targeted actions are configured based at least in part on a type of data stored on the computer system and a potential severity of an impact on the computer system if the vulnerability is exploited;

communicating the vulnerability to the vulnerability lockdown module; and implementing a vulnerability lockdown mode by the vulnerability lockdown module by causing the computer system to perform the targeted actions, wherein the targeted actions include increased logging of activities of the computer system, to change the configuration of the computer system by restricting functionality of portions of the computer system affected by the identified vulnerability.

8. The non-transitory computer readable medium of claim 7, further comprising instruction for performing operations to implement the vulnerability lockdown mode, the operations including:

changing the configuration of the computer system by limiting functionality of the computer system with respect to operations of the computer system that are affected by the identified vulnerability while permitting operations of the computer system unaffected by the identified vulnerability.

9. The non-transitory computer readable medium of claim 7, further comprising instruction for performing operations including:

providing a notification requesting configuration information via a user interface device when the targeted actions have not been configured for an identified vulnerability.

10. The non-transitory computer readable medium of claim 7, further comprising instruction for performing operations including:

disabling the vulnerability lockdown mode when the identified vulnerability is no longer detected.

11. A computer system, comprising:

a non-transitory memory configured to store processor readable instructions; and a processor coupled to the memory and operable to execute the processor readable instructions for performing operations including:

configuring a vulnerability lockdown module to perform one or more targeted actions to change a configuration of the computer system, wherein the computer system is a computer or network device connected to a network, and wherein the vulnerability lockdown module is part of an operating system (OS) of the computer system or an application executing on the OS of the computer system;

identifying vulnerabilities on the computer system;

configuring one or more targeted actions to be performed by the computer system in response to identification of a specific vulnerability or type of vulnerability, wherein the targeted actions are configured based at least in part on a type of data stored on the computer system and a potential severity of an impact on the computer system if the vulnerability is exploited;

communicating the vulnerability to the vulnerability lockdown module; and implementing a vulnerability lockdown mode by the vulnerability lockdown module by causing the computer system to perform the targeted actions, wherein the targeted actions include increased logging of activities of the computer system, to change the configuration of the computer system by restricting functionality of portions of the computer system affected by the identified vulnerability.

12. The computer system of claim 11, wherein the processor is further operable to execute the processor readable instructions for performing operations including:

changing the configuration of the computer system by limiting functionality of the computer system only with respect to operations of the computer system that are affected by the identified vulnerability while permitting operations of the computer system unaffected by the identified vulnerability.

13. The computer system of claim 11, wherein the processor is further operable to execute the processor readable instructions for performing operations including:

providing a notification requesting configuration information via a user interface device when the targeted actions have not been configured for an identified vulnerability.

14. The computer system of claim 11, wherein the processor is further operable to execute the processor readable instructions for performing operations including:

disabling the vulnerability lockdown mode when the identified vulnerability is no longer detected.

15. The computer system of claim 11, wherein the vulnerability lockdown module comprises an application executing on the computer system.

* * * * *